United States Patent
Tsubone

(10) Patent No.: US 8,220,284 B2
(45) Date of Patent: Jul. 17, 2012

(54) VEHICLE HEAT PUMP WITH A SELECTIVE HEAT STORING ELEMENT AND TWO CIRCULATION LOOPS

(75) Inventor: Kenji Tsubone, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 888 days.

(21) Appl. No.: 12/295,115

(22) PCT Filed: Mar. 21, 2007

(86) PCT No.: PCT/IB2007/000703
§ 371 (c)(1),
(2), (4) Date: Sep. 29, 2008

(87) PCT Pub. No.: WO2007/110724
PCT Pub. Date: Oct. 4, 2007

(65) Prior Publication Data
US 2010/0175413 A1    Jul. 15, 2010

(30) Foreign Application Priority Data

Mar. 27, 2006 (JP) .................. 2006-085761

(51) Int. Cl.
F25B 13/00 (2006.01)
F25B 27/00 (2006.01)
F25D 17/02 (2006.01)
F25D 3/08 (2006.01)
F28D 17/00 (2006.01)
F28D 19/00 (2006.01)
F28D 15/00 (2006.01)
F28F 27/02 (2006.01)

(52) U.S. Cl. ............. 62/324.4; 62/185; 62/201; 62/430; 62/238.6; 62/238.7; 62/529; 165/10; 165/100; 165/104.12

(58) Field of Classification Search .................. 62/324.4, 62/529, 238.6; 165/10, 100, 104.12
See application file for complete search history.

(56) References Cited

U.S. PATENT DOCUMENTS 4,219,076 A * 8/1980 Robinson, Jr. ........... 165/104.14
(Continued)

FOREIGN PATENT DOCUMENTS

DE         92 02 466.1       6/1992
(Continued)

OTHER PUBLICATIONS

Official Action dated Jan. 23, 2008 in a corresponding application.
(Continued)

Primary Examiner — Marc Norman
Assistant Examiner — Filip Zec
(74) Attorney, Agent, or Firm — Finnegan, Henderson, Farabow, Garrett & Dunner, LLP

(57) ABSTRACT

A heat storage device that includes a first heat storage material and a second heat storage material, both of which accumulate heat by heat exchange with a heat afferent medium, and a changeover device that selectively either performs or intercepts heat storage by the second heat storage material. Accordingly, if the absorption of heat by the first heat storage material has decreased, the changeover device changes flow of the second heat storage material so that heat may be extracted from the heat afferent medium by the second heat storage medium. Thus, when the heat afferent medium is a refrigerant, it is possible to supercool the refrigerant thereof. Furthermore, since heat is extracted from the heat afferent medium and is accumulated, accordingly it is possible to anticipate effective utilization thereof.

6 Claims, 12 Drawing Sheets

U.S. PATENT DOCUMENTS

| | | | |
|---|---|---|---|
| 4,240,077 A | 12/1980 | Hughes et al. | |
| 4,402,188 A * | 9/1983 | Skala | 62/56 |
| 4,840,037 A * | 6/1989 | Yamada et al. | 62/199 |
| 4,933,909 A | 6/1990 | Cushing et al. | |
| 5,553,662 A | 9/1996 | Longardner et al. | |
| 5,735,133 A | 4/1998 | Voss et al. | |
| 6,059,016 A | 5/2000 | Rafalovich et al. | |
| 6,640,889 B1 * | 11/2003 | Harte et al. | 165/202 |
| 6,662,864 B2 | 12/2003 | Burk et al. | |
| 2001/0020529 A1 | 9/2001 | Karl | |
| 2001/0052238 A1 | 12/2001 | Burk et al. | |
| 2004/0089014 A1 | 5/2004 | Amaral et al. | |

FOREIGN PATENT DOCUMENTS

| | | |
|---|---|---|
| DE | 196 29 114 A1 | 1/1998 |
| EP | 1 533 154 A1 | 5/2005 |
| JP | 1-147256 | 6/1989 |
| JP | 1-247932 | 10/1989 |
| JP | 2-220293 A | 9/1990 |
| JP | 2-223768 A | 9/1990 |
| JP | 5-286350 | 11/1993 |
| JP | 6-22572 | 1/1994 |
| JP | 7-4686 | 1/1995 |
| JP | 8-49934 A | 2/1996 |
| JP | 8-219500 | 8/1996 |
| JP | 11-173710 A | 7/1999 |
| JP | 2000-94953 A | 4/2000 |
| JP | 2003-336974 | 11/2003 |

OTHER PUBLICATIONS

Office Action dated Jul. 7, 2008 in U.S. Appl. No. 10/521,017, 12 pages.

Office Action dated Apr. 7, 2009 in U.S. Appl. No. 10/521,017, 11 pages.

* cited by examiner

VEHICLE HEAT PUMP WITH A SELECTIVE HEAT STORING ELEMENT AND TWO CIRCULATION LOOPS

BACKGROUND OF THE INVENTION

1. Field of the Invention

The present invention relates to a heat storage device that temporarily accumulates heat (or cold energy) held in a medium such as a refrigerant or the like.

2. Description of the Related Art

In the art related to the invention, a compression type heat pump is known as one example of a heating device. The fundamental construction thereof is that a compressor compresses a refrigerant gas, the refrigerant gas dissipates heat so that it condenses, and then, the refrigerant is expanded adiabatically, and absorbs external heat so that it vaporizes, and thereafter is compressed again. Accordingly, if for example a vehicle is to be air conditioned, the air within the passenger compartment is cooled by taking advantage of the action of the refrigerant to absorb heat, so that the air in the passenger compartment is cooled.

In a vehicle, the power source for propelling the vehicle, such as an engine or the like, is used to drive the heat pump. Accordingly, if the vehicle is stationary, the power source drives the compressor by raising the idling rotational speed of the engine. Conversely, if the vehicle runs at a comparatively high speed while coasting, it is possible that the compressor may be driven to an excessive degree. Moreover, the heat that is created along with the air conditioning, in other words the heat held in the refrigerant, which is compressed, is transferred to the outside environment. Since, with the power being primarily outputted by the power source for driving the vehicle in this manner, from the point of view of the heat pump, the power supply is unstable, accordingly the loss of energy becomes great, and, by extension, there is a possibility that the fuel consumption of the vehicle will increase.

In the past, Japanese Patent Application Publication No. 5-286350 (JP H5-286350) describes an air conditioning device in which thermal accumulators are fitted both to a condenser in which pressurized refrigerant is condensed and to an evaporator in which the refrigerant is adiabatically expanded and vaporized, in order to utilize energy more effectively. With this air conditioning device, on the one hand, the heat that is emitted from the condenser is accumulated in the heat storage material, and it is arranged to use the heat in the heat storage material for heating, by selectively circulating brine (a thermal medium) between this heat storage material and a heat dissipation section of a heat exchanger within the passenger compartment, or a panel heater or the like for room heating. Furthermore, the temperature of the cold storage material is decreased by the evaporator absorbing heat from the cold storage material, and it is arranged to perform air conditioning by the cold storage material, by selectively circulating another brine (a thermal medium) between this cold storage material and a heat exchange device within the passenger compartment.

Furthermore, in Japanese Patent Application Publication No. 7-4686 (JP H7-4686), there is described an air conditioning device which is provided with a heat exchanger for cold storage and a heat exchanger for heat storage, and this is suitable as a so called stationary air conditioning device, such as one for household use or the like. Moreover, Japanese Patent Application Publication No. 2003-336974 (JP 2003-336974), describes a heat storage type heat exchanger; and, along with a heat source fluid and a heat recovery fluid being brought into mutual contact via a wall surface, the heat exchanger incorporates a heat storage material around flow conduits in which these respective fluids flow.

A technique for converting heat into electric power by using a thermoelectric element and storing the electricity is described in Japanese Patent Application Publication No. 6-22572 (JP H6-22572). Furthermore, in Japanese Patent Application Publication No. 1-247932 (JP H1-247932), there is described a technique in which, when heat exchange is not necessary, in order to prevent useless heat dissipation or heat absorption via the thermal medium, the thermal medium is drained from a heat exchanger on the side interior to the vehicle.

As described in JP H5-286350, JP H7-4686, and JP 2003-336974, if a heat storage material, which is able store heat or cold is employed, then heat is not radiated uselessly, and, since it is possible to perform heat recovery or energy recovery, accordingly it becomes possible to enhance the fuel consumption of the vehicle. However, because the refrigerant, which is circulating in the refrigerant cycle, and the brine (the thermal medium), which is circulating to the heat exchanger within the passenger compartment, for air conditioning are both circulated according to demand, accordingly the time period of heat exchange in the heat storage type heat exchanger between the refrigerant and the brine (the thermal medium) or the heat storage material, and the heat exchange area and the like, impose a limitation, and there is a possibility that it may not necessarily be possible to perform heat storage or cold storage sufficiently. Furthermore, since there is also a limitation upon the amount of heat that can be stored in the heat storage material, accordingly there is a possibility that it will not be possible sufficiently to recover the heat that could be recovered. In this case, the heat in the refrigerant is not sufficiently dissipated by the thermal accumulator so that it does not go into the supercooled state, and the amount of heat transported by the refrigerant becomes relatively small, or the refrigerant gas is supplied to the cold storage device just as it is, so that, along therewith, there is a possibility that the thermal efficiency of the refrigeration cycle will be reduced.

SUMMARY OF THE INVENTION

The present invention is to provide a heat storage device, which is capable of performing sufficient heat exchange, as required, with a medium which constitutes a heat source, and of accumulating this heat (or cold energy).

A first aspect of the invention includes a heat storage device comprising a first heat storage material, which exchanges heat with a heat afferent medium that accumulates heat, such as a refrigerant, and a second heat storage medium, which also exchanges heat with the heat afferent medium and accumulates heat, and a changeover means, which selectively performs or intercepts heat exchange between the heat afferent medium and the second heat storage medium.

If the temperature difference between the heat afferent medium and the first heat storage material is reduced, then the heat exchange efficiency between the two elements will decrease. According to the first aspect of the invention, however, by setting up heat exchange between the second heat storage medium and the heat afferent material as well, it is possible to accumulate the heat (or the cold energy) held by the heat afferent medium in the second heat storage medium. Accordingly, it is possible to transfer the heat contained by the heat afferent medium to the heat storage material to the necessary degree, thereby reducing the temperature of the heat afferent medium. On the other hand, if it is possible to receive heat sufficiently by the first heat storage material from the heat afferent medium and thereby to reduce the temperature of the heat afferent medium, then, since no heat exchange is set up between the second heat storage medium and the heat afferent medium, accordingly it becomes unnecessary to flow the second heat storage medium to a heat exchange side, so that it is possible to avoid unnecessary energy is consumed unnecessarily.

In the first aspect of the invention, the second heat storage medium may be a thermal medium that circulates between a site where it exchanges heat with the heat afferent medium, and a site where it exchanges heat with the first heat storage material.

Thus, along with the thermal medium itself performing heat storage operation, the thermal medium also repeatedly transports the heat from the heat afferent medium to the first heat storage material, and this heat is accumulated in the first heat storage material. Accordingly it is possible to accumulate the heat (or the cold energy), which is held in the heat afferent medium sufficiently in the first heat storage material.

The first aspect of the invention may further include a heat demand unit, such as, for example, a heat exchanger provided within the passenger compartment, to which the thermal medium is supplied, and the changeover means comprises a means, which circulates the thermal medium between the sites, when there is no heat demand by the heat demand unit. The changeover means may be, for example, the three-way valve for switching over the flow of the thermal medium.

Accordingly, the thermal medium is provided to transport heat to the heat demand unit, and, if there is no demand for heat by the heat demand unit, then, if the heat afferent medium brings in heat, the thermal medium transports the heat held by the heat afferent medium to the first heat storage material, where the heat is stored. Accordingly, it is possible to promote heat storage by taking advantage of an existing thermal medium, and, due to this, it is possible to simplify the structure as a whole, while minimizing the number of additional components required.

The second heat storage medium of the heat storage device may include a thermal medium that exchanges heat exchange between the heat afferent medium and the first heat storage material. The heat storage device may further comprise a first circulation path, which circulates the thermal medium between a site at which heat is exchanged between the heat afferent medium and the first heat storage material, and the heat demand unit, a second circulation path, having a portion in common with the first circulation path, and which moreover circulates the thermal medium so as to repeatedly supply the thermal medium to the site without passing it through the heat demand unit, and a tank which is interposed in a portion common to the first and second circulation path and which retains the thermal medium.

Thus, it is possible to make the amount of the thermal medium, which functions as the second heat storage medium, large, accordingly, along with it being possible to make the amount of heat, which is stored by being received and being accumulated from the heat afferent medium, large. Also it is possible to supply an amount of heat corresponding to variations in the amount of heat requested by the heat demand unit, and moreover it is possible to suppress pulsation of the thermal medium.

Furthermore, a heat exchanger is further provided in the interior of the first heat storage material, where the heat afferent medium and the first heat storage material and the second heat storage medium perform heat exchange via a division wall.

The division wall delimits the heat afferent medium and the first and second heat storage materials. The wall may be made thin, so long as the thickness is within the range that allows it to attain its objectives. As a result, it is possible to enhance the efficiency of heat exchange between all three of the heat afferent medium and the heat storage materials.

The heat afferent medium of the heat storage device may include a refrigerant having a refrigeration cycle in which, along with its internal energy being decreased by heat dissipation after it has been pressurized, its internal energy is increased by absorption of heat after it has expanded adiabatically.

Accordingly, the first heat storage material may include at least one of a heat storage material, which receives and thermally stores heat from the refrigerant, and a cold energy storage material, which supplies heat to the refrigerant and accumulates cold energy.

In the latter aspects of the invention, in the refrigeration cycle, it is possible sufficiently to extract and to store heat from the refrigerant. Accordingly, in addition to heat not being radiated uselessly, it is moreover possible to enhance the thermal efficiency of the refrigeration cycle, since it is possible reliably to liquefy the refrigerant. Furthermore, in the case of storage of cold, in addition to it being possible to perform such cold storage by sufficiently transferring heat to the refrigerant, also, by ensuring that the refrigerant is evaporated, it is possible to enhance the thermal efficiency as a whole.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE INVENTION

Figure 1:
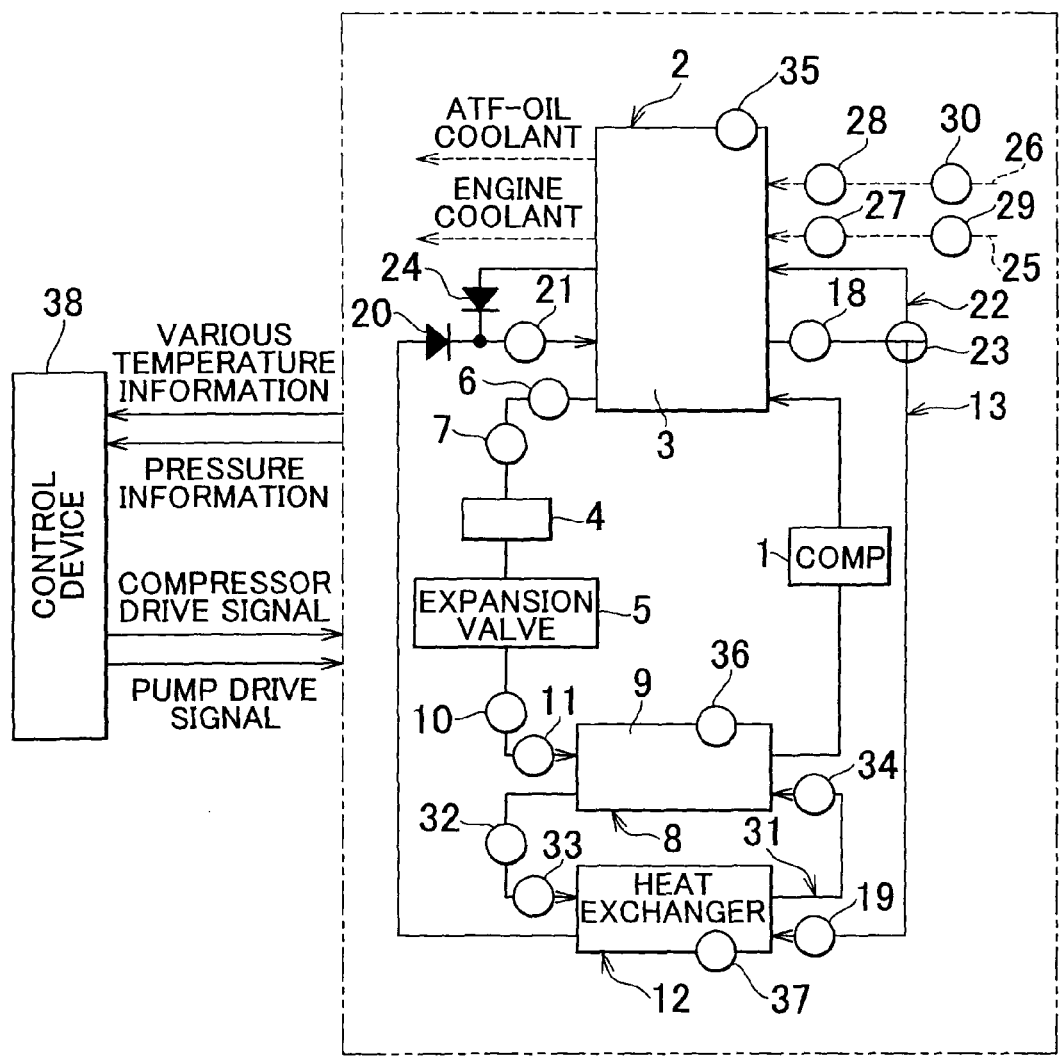
FIG. 1 is a block diagram showing an example in which the present invention is applied to a refrigeration cycle.

Next, this invention will be explained in concrete terms. The example shown in FIG. 1 is an example in which this invention has been applied to a condenser and an evaporator for a heat pump that operates on a refrigeration cycle, and, first to explain this refrigeration cycle: a compressor 1, which is driven by a power source such as an engine or an electric motor (neither of these is shown in the figures) or the like, compresses refrigerant, and is connected a heat storage device, such as the condensation device 2 (a condenser), on its discharge side. This heat storage type condensation device 2 liquefies the refrigerant by extracting, with a heat storage material 3, the heat from the refrigerant after its temperature has been elevated by pressurization and compression. The heat storage material 3 corresponds to the "first heat storage material" of the Claims. A sensible heat storage material or a latent heat storage material may be employed as the heat storage material 3, but it is more desirable to employ a heat storage material that accumulates heat due to the latent heat of a change of its state at the operating temperature range of this refrigerant cycle.

A receiver tank 4 and an expansion valve 5 are connected, in the stated order, to the output side of the above described heat storage type condensation device 2. The receiver tank 4 temporarily retains refrigerant (liquid refrigerant) that has been liquefied by heat dissipation, and separates the liquid refrigerant and the gaseous refrigerant, which are combined together. A temperature sensor 6 and a pressure sensor 7 are interposed in a conduit between the receiver tank 4 and the heat storage type condensation device 2. Furthermore, the expansion valve 5 allows the refrigerant to expand adiabatically, so that its pressure decreases. A throttle valve or a capillary tube, or the like, may be employed as the expansion valve 5.

A cold storage type evaporation device 8 (an evaporator) is provided for supplying heat to the refrigerant, which has been adiabatically expanded and thus vaporizing it. This cold storage type evaporation device 8 is a heat storage device which incorporates a heat storage material 9 that accumulates so-called cold energy by supplying sensible heat or latent heat to the refrigerant; desirably, the heat storage material 9 that is thus incorporated accumulates cold energy due to the latent heat of a change of its state at the operating temperature range of this refrigerant cycle. In a conduit between the expansion valve 5 and the cold storage type evaporation device 8, there are interposed a pressure sensor 10 that detects the pressure of the refrigerant, which has been adiabatically expanded, and a temperature sensor 11. And the output side of the cold storage type evaporation device 8 is connected to the input side of the compressor 1.

The heat and the cold energy which are generated in the refrigeration cycle described above may be used as heat energy, and, as one example, they may be used for air conditioning the passenger compartment of a vehicle. For this, a heat exchanger 12 is provided in the passenger compartment heats the air within the passenger compartment due to heat contained in the refrigerant, which has been compressed, or due to heat contained in the heat storage type condensation device 2, or which cools the air within the passenger compartment by absorbing the heat in the passenger compartment, or due to the cold energy contained in the cold storage type evaporation device 8. To explain the structure for supplying the heat for heating to this heat exchanger 12 within the passenger compartment, a first circulation path 13 is provided for circulating a thermal heating medium (brine) between the heat storage type condensation device 2 and the heat exchanger 12 within the passenger compartment.

Figure 2:
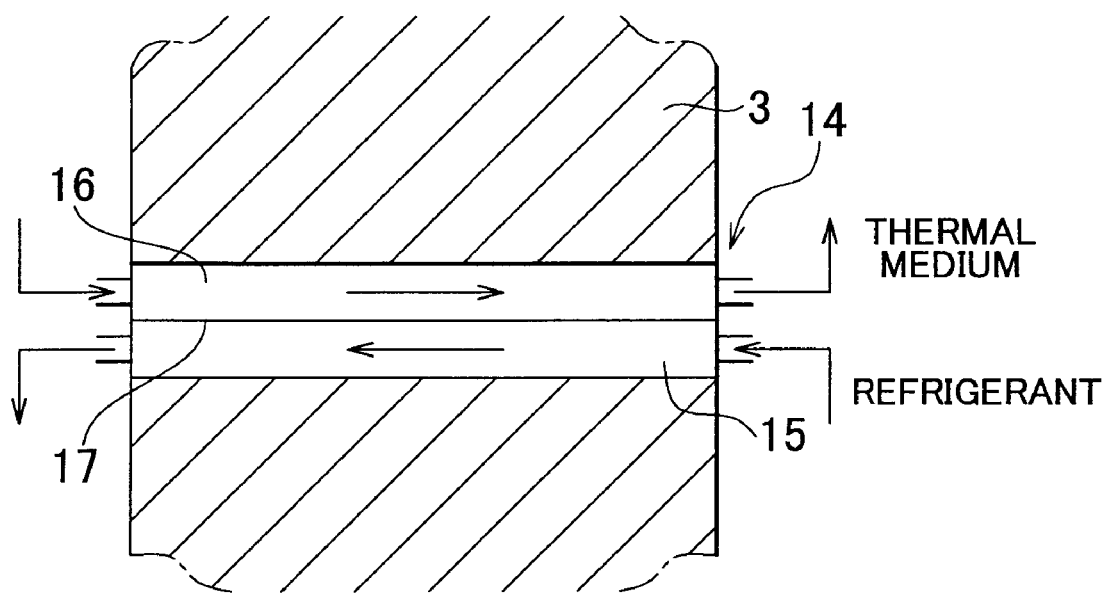
FIG. 2 is a figure schematically showing an example of a heat exchanger thereof.

The exchange of heat between the thermal heating medium and the refrigerant occurs in the interior of the heat storage type condensation device 2; an example of a heat exchanger for performing this is schematically shown in FIG. 2. A refrigerant flow conduit 15 and a thermal medium flow conduit 16 embedded within the heat storage material 3 of the heat storage type condensation device 2, and the flow conduits 15 and 16 are delimited from one another by a dividing wall 17. Furthermore, the refrigerant and the thermal heating medium flow in their respective flow conduits 15 and 16 in mutually opposite directions. Moreover, the flow conduits 15 and 16 and the heat storage material 3 are in mutual contact through the division walls which constitute the flow conduits 15 and 16. Accordingly, the heat contained in the refrigerant may be transferred to the thermal heating medium and the heat storage material 3, and furthermore the heat from the refrigerant and the heat storage material 3 to be transmitted to the thermal medium. It should be understood that it would also be acceptable to provide fins on the division walls, which constitute the flow conduits 15 and 16, extending into the interior of the heat storage medium 3.

A pump 18 and a temperature sensor 19 are interposed in the so called outward path in the first circulation path 13, in which the thermal heating medium flows from the heat storage type condensation device 2 to the heat exchanger 12 within the passenger compartment. Furthermore, a non-return valve 20 and a temperature sensor 21 are interposed in the so called return path, in which the thermal heating medium flows from the heat exchanger 12 within the passenger compartment to the heat storage type condensation device 2. The non-return valve 20 is a valve which permits flow of the thermal heating medium in the so called forward direction from the heat exchanger 12 within the passenger compartment towards the heat storage type condensation device 2, while preventing flow in the direction opposite thereto, i.e. in the so called reverse direction.

Furthermore, a second circulation path 22 is provided, pierced through the heat storage material 3 to exchange heat with the heat storage material 3. This second circulation path 22 circulates the thermal heating medium in the interior of the heat storage material 3 without passing it through the heat exchanger 12 within the passenger compartment, and a three-way valve 23, which diverts flow of the thermal medium into the second circulation path 22, is interposed at the discharge side of the pump 18 in the previously described so called outward path of the first circulation path 13. Furthermore, another non-return valve 24 is provided at the other end portion of the second circulation path 22, and the discharge side of the non-return valve 24 is connected between the non-return valve 20 and the temperature sensor 21 in the so called return path of the first circulation path 13. The non-return valve 24 is provided so that the thermal medium that passed through the interior of the heat storage material 3 may flow towards the so called return path of the first circulation path 13.

The heat storage material 3 of the heat storage type condensation device 2 described above recovers heat from, or is heated by, a fluid other than the thermal material for heating. For example, an engine coolant conduit 25 and a coolant conduit 26 for the oil of an automatic transmission (ATF oil) may be provided as being pierced through the heat storage material 3, to exchange heat with the heat storage material 3. Respective temperature sensors 27 and 28 and pumps 29 and 30 are interposed in these conduits 25 and 26.

Furthermore, in order to cool the air in the passenger compartment, a third circulation path 31 is provided for selectively circulating the thermal medium (brine) for air conditioning between the cold storage type evaporation device 8 and the heat exchanger 12 in the passenger compartment. This third circulation path 31 exchanges heat between the refrigerant and the heat storage material 9 in the interior of the cold storage type evaporation device 8 and the thermal medium for air conditioning; a heat exchanger of the same type as the structure shown in FIG. 2 and previously described may be employed as this heat exchanger. Furthermore, a pump 32 and a temperature sensor 33 are interposed in the so called outward path, along which the thermal medium for air conditioning in the third circulation path 31 flows from the cold storage type evaporation device 8 towards the heat exchanger 12. Moreover, a temperature sensor 34 is interposed in the so called return path, along which the thermal medium for air conditioning flows from the heat exchanger 12 towards the cold storage type evaporation device 8. It should be understood that a temperature sensor 35 is provided for detecting the temperature of the heat storage material 3, a temperature sensor 36 is provided for detecting the temperature of the cold storage type evaporation device 8, and a temperature sensor 37 is provided for detecting the temperature of the air which is blown out of the heat exchanger 12 in the passenger compartment.

The operation of the compressor 1 and each of the pumps described above are electrically controlled. A control device 38 is provided to control the three way valve 23 and the pump 18 so that the thermal medium is circulated between heat exchange sites. The control device 38 may, for example, be one that principally consists of a microcomputer; the temperature information and the pressure information detected by the various temperature sensors and pressure sensors described above are inputted thereto, and moreover other signals such as an air conditioning request signal and a heating request signal, not shown in the figures, are also inputted thereto.

Next, the operation of the device described above will be explained. First, to explain the operation of the refrigeration cycle in simple terms, the compressor 1 is driven when a request for air conditioning is received. The gaseous refrigerant is then pressurized and compressed. The temperature of the refrigerant increases along with the elevation of its pressure so that it becomes a superheated vapor, and then the heat therein is dissipated by the heat storage type condensation device 2, so that heat is transferred to the thermal heating medium and the heat storage material 3 in the heat exchanger 14 shown in FIG. 2. As a result, the temperature of the refrigerant (i.e. the internal energy of the refrigerant) gradually decreases, causing the refrigerant to condense. The temperature sensor 6 detects the temperature of the condensed refrigerant, and the pressure sensor 7 detects the pressure of the condensed refrigerant. When the refrigerant is not supercooled, the temperature and pressure are higher than certain predetermined values, which are determined according to the system design.

The refrigerant that has condensed is temporarily retained in a receiver tank 4. In this case, if some refrigerant that is not condensed is mixed in therewith, separation into gas and liquid is performed herein. Next, the refrigerant is adiabatically expanded through the expansion valve 5, and, due to the evaporation of a portion of the refrigerant, transitions into a state in which liquid refrigerant and gaseous refrigerant are mixed together. The pressure sensor 10 detects the pressure of the mixed phase refrigerant, and moreover the temperature sensor 11 detects the temperature of the mixed phase refrigerant. The mixed phase refrigerant is fed to the cold storage type evaporation device 8, where it absorbs heat from the cold energy storage medium 9 or the thermal medium for air conditioning, and evaporates. Accordingly, cold energy is accumulated in the cold storage type evaporation device 8 so that the temperature of the cold storage type evaporation device 8 is reduced, and, in the process, the thermal medium for air conditioning is cooled. The refrigerant that has been vaporized in this manner is again pressurized and compressed by the compressor 1.

It should be understood that since, in the above described heat storage type condensation device 2, the structure is arranged so that heat exchange takes place between the heat storage material 3 and the engine coolant and the automatic transmission oil coolant, accordingly, if the temperature of these coolant flows is low, the coolant is heated by the heat contained in the heat storage material 3, and so called accelerated engine warm up occurs. Furthermore, if the temperature of these coolant flows is high due to the operation of the vehicle, then the heat in these coolant flows is transmitted to the heat storage material, so that heat is recovered.

Condensation of the refrigerant in the manner described above is performed by the heat storage material 3 or the thermal heating medium extracting heat therefrom, but, if the temperature of the heat storage material 3 around the refrigerant flow conduit 15 of the heat exchanger 14 shown in FIG. 2 has gradually been increased, or if the thermal heating medium does not transport the heat, then the efficiency in cooling the refrigerant decreases, and there is a possibility that the refrigerant cannot be cooled down as far as the supercooled state. Thus, with embodiment of the present invention, as described below, supercooling is performed forcibly, in order reliably to cool the refrigerant down to the supercooled state.

Figure 3:
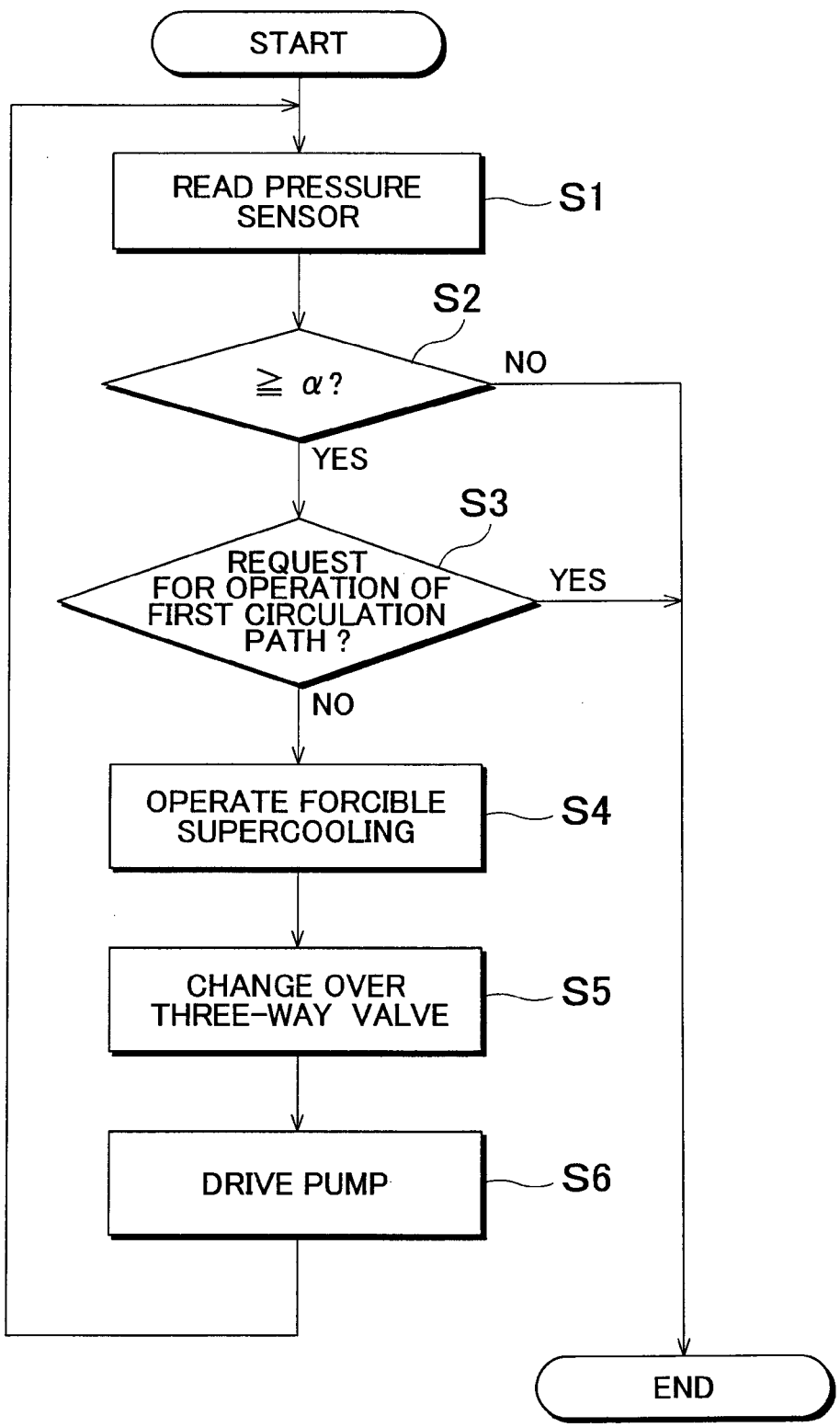
FIG. 3 is a flow chart for explanation of an example of control, which takes as its object the system shown in FIG. 1.

FIG. 3 is a flow chart that explains the supercooling operation: first (in a step S1) the value detected by the pressure sensor 7, which is provided between the heat storage type condensation device 2 and the receiver tank 4, is read in. Next, it is determined whether the detected pressure which is greater than or equal to a reference value a, which has been set in advance (in a step S2). The reference value a is a pressure, which is determined according to the design, of the refrigerant when the refrigerant has attained the supercooled state or a pressure approximately equal thereto, or is a pressure that is obtained by experiment. If the decision in this step S2 is negative, then, since it is possible to decide that the pressure has sufficiently decreased and the refrigerant has become supercooled, no particular control is performed, and the process in FIG. 3 ends. It should be understood that it would also be acceptable to to determine whether the supercooled state has been attained based upon the temperature, instead of the pressure.

An affirmative decision in the step S2 indicates that the amount of refrigerant that has not condensed is large and supercooling has not occurred, accordingly supercooling is forcibly performed. In other words, a decision is made (in a step S3) as to whether there is a request for operation of the first circulation path 13 as described above. Because the first circulation path 13 is the conduit for circulating the thermal heating medium, the determination in the step S3 may similarly determine whether a request for heating the passenger compartment of the vehicle has been made. If this decision in the step S3 is affirmative, then no particular control is performed, and the process in FIG. 3 ends. In other words, forcible supercooling is not performed. If the thermal heating medium is circulating between the heat storage type condensation device 2 and the heat exchanger 12 within the passenger compartment, and heat is thus being conveyed to the heat exchanger 12 within the passenger compartment, then the refrigerant will attain the supercooled state, since sufficient heat is being extracted from the refrigerant. In particular, if the heat exchanger 14 has the structure shown in FIG. 2, then, since the refrigerant and the thermal heating medium are in contact with one another via the division wall 17, accordingly the heat exchange efficiency between the two of them is satisfactory, and the refrigerant is sufficiently cooled to the degree required. It should be understood that, in this state, the three way valve 23 is switched over to allow communication between the heat storage type condensation device 2 and the heat exchanger 12 within the passenger compartment, so that the thermal heating medium is circulated by the pump 18. Furthermore, the heat for evaporating the refrigerant is supplied from the cold energy thermal storage material, and accordingly cold energy is accumulated in the cold storage type evaporation device 8.

Conversely to this, if a negative decision is reached in the step S3 due to no request to heat the passenger compartment has been made, then it is determined that the forcible supercooling mode should be activated, and control for this purpose is initiated (in a step S4). First, the three way valve 23 is changed over (in a step S5), and, as previously described, the conduits are changed over so that the thermal heating medium is circulated in the second circulation path 22. Furthermore, the pump 18 is operated (in a step S6). Accordingly, because the thermal heating medium does not remain stationary but circulates around the second circulation path 22, accordingly heat is extracted from the refrigerant, and the refrigerant is cooled, until the temperature of all of the thermal heating medium in the interior of the second circulation path 22 becomes equal to the temperature of the refrigerant. In other words, the thermal heating medium functions as a heat storage material. Furthermore, the thermal heating medium, which circulates in the second circulation path 22, transmits heat to the heat storage material 3 at its portion where the conduit pierces through the heat storage material 3. In other words, while the heat storage material 3 in the neighborhood of the refrigerant flow conduit 15 receives heat from the refrigerant so that its temperature is elevated at an early stage, sometimes the temperature of the heat storage material 3 at locations, which are separated from the refrigerant flow conduit 15, is relatively low, and the thermal heating medium, which is flowing in the second circulation path 22, transports heat to the heat storage material at the locations where the temperature is low.

Since, along with the thermal heating medium, which is circulating in the second circulation path 22, itself having a heat storage function in the manner described above, also heat transmission to the heat storage material 3 is promoted, accordingly it is possible sufficiently to ensure the amount of heat that is extracted from the refrigerant, so that it is possible to supercool the refrigerant. As a result, it is possible to enhance the thermal efficiency of the refrigeration cycle as a whole. Moreover, since it is possible to accumulate heat due to the condensation of the refrigerant, and also cold energy due to the evaporation thereof, accordingly it is possible to anticipate effective utilization of the heat energy, and furthermore, by extension, it is possible to reduce the fuel consumption of the vehicle.

The example described above is an example in which the second thermal medium for heat storage is provided, but, with the present invention, it would also be possible to employ a structure in which the second thermal medium was provided for accumulating cold energy. In the example shown in FIG. 4, the circulation path through which the thermal medium for air conditioning circulates is provided upon the side of the cold storage type evaporation device 8, and moreover this is an example in which an accumulator is used, instead of the receiver tank 4. To explain this in concrete terms, a three way valve 39 is interposed in the third circulation path 31, between the pump 32 and the temperature sensor 33 on the outward path, via which the thermal medium for air conditioning flows from the cold storage type evaporation device 8 towards the heat exchanger 12. A non-return valve 41 is interposed in a fourth circulation path 40, which branches off at this three way valve 39, and moreover the discharge side of the non-return valve 41 is communicated to the upstream side of the temperature sensor 34 on the return path of the third circulation path 31, via which the thermal medium for air conditioning flows from the heat exchanger 12 towards the cold storage type evaporation device 8. Furthermore, another non-return valve 42 is interposed upon the return path, upstream of the portion at which the fourth circulation path 40 is connected. And the structure is such that these non-return valves 41 and 42 open in the direction in which the thermal medium for air conditioning flows towards the inflow portion of the cold storage type evaporation device 8, and close in the opposite direction.

On the other hand, upon the conduits that make up the refrigeration cycle, an accumulator 43 is connected to the intake side of the compressor 1, and moreover the pressure sensor 10 and the temperature sensor 11 are disposed, in order, upstream of the accumulator 43. Since the other structures are the same as the ones shown in FIG. 1, the same reference symbols as in FIG. 1 are appended to elements, which are the same as those in FIG. 1, and the description thereof is curtailed.

Figure 4:
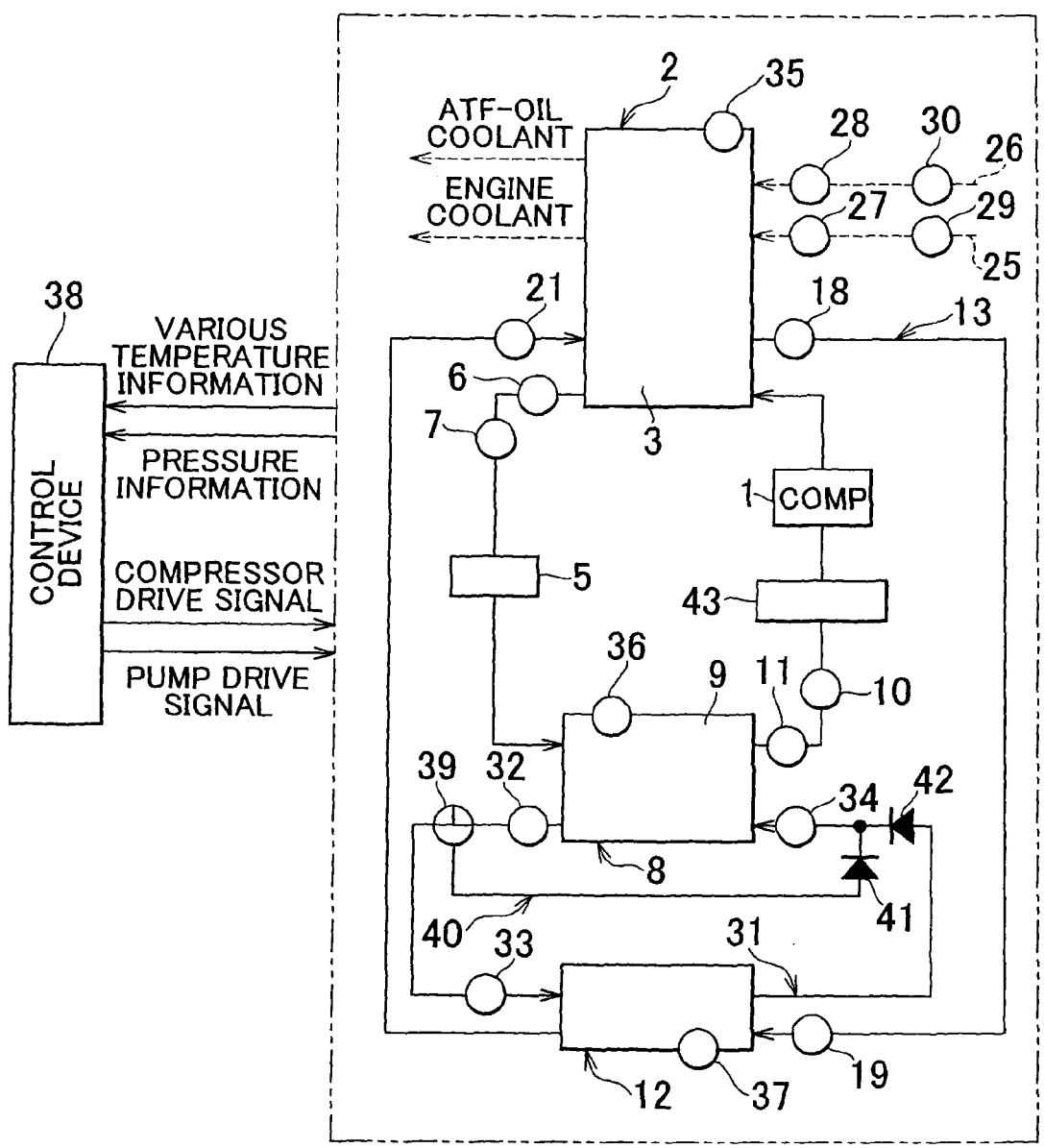
FIG. 4 is a block diagram showing another example in which the present invention is applied to a refrigeration cycle.
Figure 5:
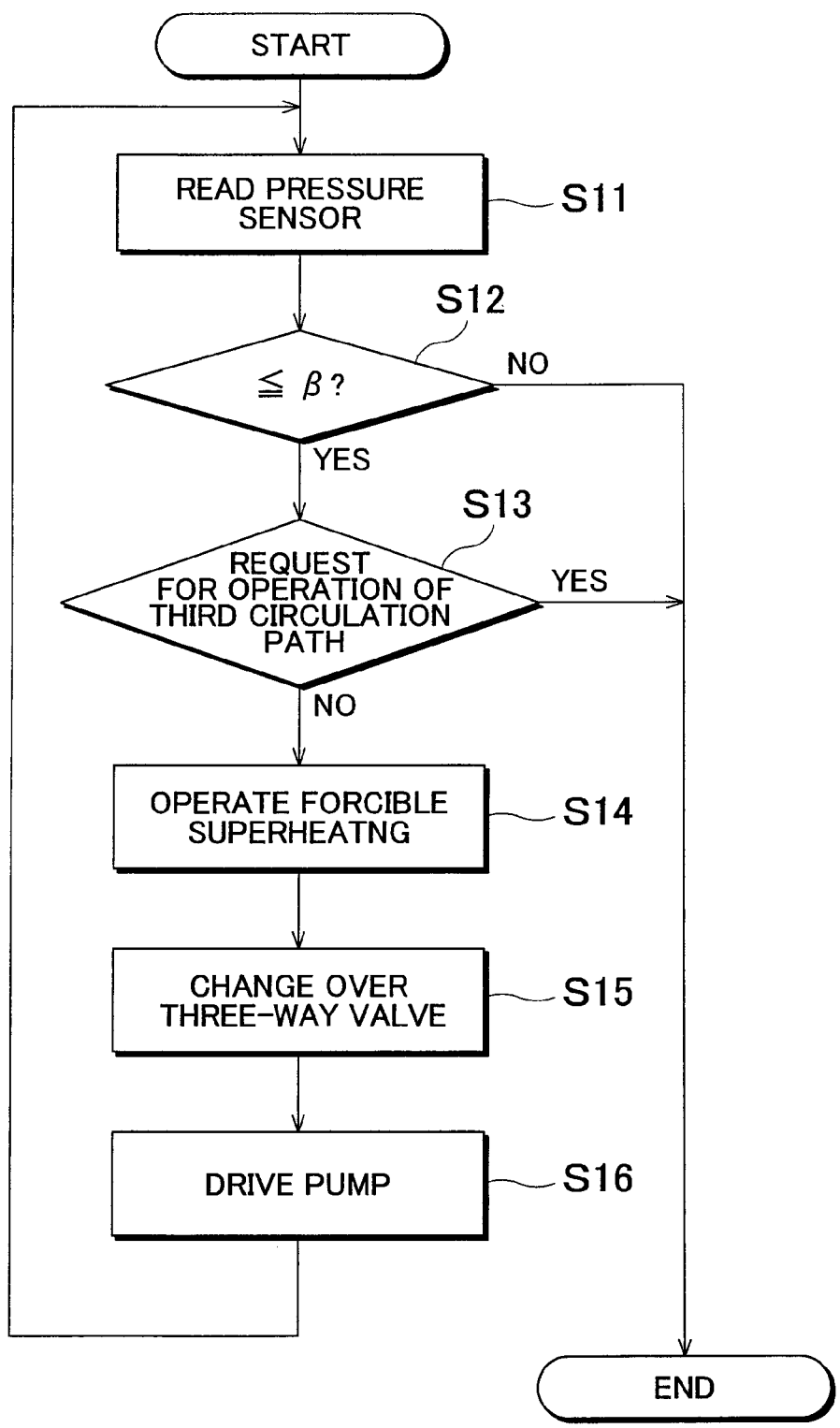
FIG. 5 is a flow chart for explanation of an example of control, which takes as its object the system shown in FIG. 4.

In the case of a structure like that shown in FIG. 4, it is possible to make the thermal medium for air conditioning function as another cold storage material, being used in parallel with the cold energy thermal storage material 9. An example of this type of operation is shown in the flow chart of FIG. 5. First, the value detected by the pressure sensor 10, which is provided between the cold storage type evaporation device 8 and the accumulator 43, is read in (in a step S11). Next, a decision is made as to whether the detected pressure is less than or equal to a reference value $\beta$, which has been set in advance (in a step S12). The reference value $\beta$ is a pressure that is determined according to the design as being the pressure at which the refrigerant is sufficiently vaporized or a pressure approximately equal thereto, or is a pressure that is obtained by experiment. A negative decision in step S12 indicates that the refrigerant has become sufficiently vaporized and the pressure has risen sufficiently, no particular control is performed, and the process shown in FIG. 5 ends. It should be understood that it would also be acceptable to arrange for the determination, as to whether the refrigerant has become sufficiently vaporized, to be performed based upon the temperature, instead of the pressure.

An affirmative decision in step S12 indicates that the amount of refrigerant that has not vaporized is large and that a state of mixed refrigerant has occurred, accordingly operation for forcible superheating is performed. In other words, a decision is made (in a step S13) as to whether there is a request for operation of the third circulation path 31 as described above. Since the third circulation path 31 is the conduit for circulating the thermal medium for air conditioning, this decision in the step S13 may be replaced by a decision as to presence or absence of a request for air conditioning the vehicle passenger compartment. If the decision in the step S13 is affirmative, then no particular control is performed, and the process shown in FIG. 5 ends. In other words, forcible superheating is not performed. If the thermal medium for air conditioning is circulating between the cold storage type evaporation device 8 and the heat exchanger 12 within the passenger compartment, and heat is thus being conveyed to the heat exchanger 12 within the passenger compartment, then the refrigerant will attain the superheated state, since heat is being sufficiently well supplied to the refrigerant. It should be understood that, in this state, the three-way valve 39 is switched over to its state in which it communicates together the cold storage type condensation device 8 and the heat exchanger 12, so that the thermal medium for air conditioning is circulated by the pump 32. Furthermore, the heat, due to condensation of the refrigerant, is extracted by the heat storage material 3, and accordingly heat is accumulated in the heat storage type condensation device 2.

Conversely to this, if a negative decision is reached in the step S13 due to no air conditioning request being present, then it is determined that the forcible supercooling mode should be activated, and control for this purpose is initiated (in a step S14). First, the three-way valve 39 is operated so as to be changed over (in a step S15), and the conduits are changed over so that the thermal medium for air conditioning is circulated in the fourth circulation path 40. Furthermore, the pump 32 is operated (in a step S16). Accordingly, since the thermal medium for air conditioning does not remain stationary but flows while repeatedly circulating around the fourth circulation path 40, accordingly heat is supplied to the refrigerant, and the refrigerant is superheated, until the temperature of all of the thermal medium for air conditioning in the interior of the fourth circulation path 40 becomes equal to the temperature of the gaseous refrigerant. In other words, the thermal heating medium functions as a cold energy storage material.

Since the thermal heating medium, circulating in the fourth circulation path 40, itself has a heat storage function (a cold storage function) in the manner described above, it is possible sufficiently to ensure the amount of heat by which the refrigerant is superheated, so that it is possible to perform vaporization of the refrigerant. As a result, it is possible to enhance the thermal efficiency of the refrigeration cycle as a whole. Moreover, since it is possible to accumulate heat due to the condensation of the refrigerant, and also cold energy due to the evaporation thereof, accordingly it is possible to anticipate effective utilization of the heat energy, and furthermore, by extension, it is possible to enhance the fuel consumption of the vehicle.

Figure 6:
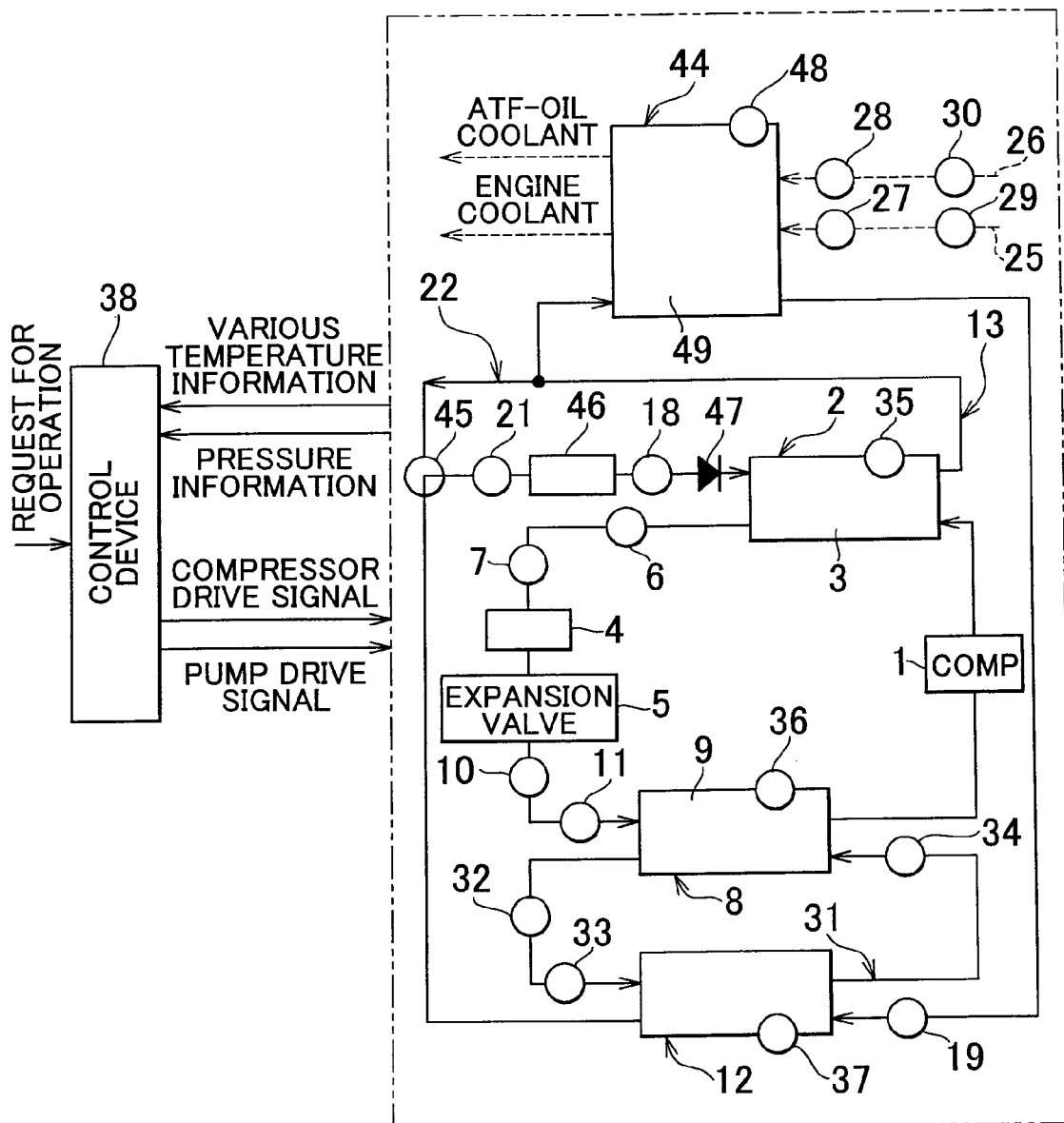
FIG. 6 is a block diagram showing yet another example in which the present invention is applied to a refrigeration cycle.

By the way while, in the example shown in FIG. 1 and previously described, the structure was such that the thermal heating medium was endowed with the function of receiving heat from the refrigerant and accumulating that heat, and also operated as a mechanism for transporting heat to the heat storage material 3, the present invention could also be built so that, if no request to heat the vehicle passenger compartment has been made, the thermal heating medium only fulfils the function of storing heat. This example is shown in FIG. 6. In this example shown in FIG. 6, a thermal accumulator 44 which adds heat to the coolant flows, and which also receives heat from these coolant flows and stores that heat, is provided separately from the heat storage type condensation device 2. And the first circulation path 13 circulates the thermal heating medium through this heat storage type condensation device 2 and thermal accumulator 44. By contrast, the second circulation path 22 branches off from the first circulation path 13 between the heat storage type condensation device 2 and the thermal accumulator 44, and moreover is connected to the first circulation path 13 on its so called return path between the heat exchanger 12 and the temperature sensor 21. And a three-way valve 45 is interposed at this connection portion, so that, with this three-way valve 45, it is possible to change between a state of communication with the first circulation path 13, and a state of communication with the second circulation path 22.

The conduit between this three-way valve 45 and the heat storage type condensation device 2 is a portion that is common to the first circulation path 13 and the second circulation path 22, and, in this so called common portion, there are interposed a temperature sensor 21, a retaining tank 46, a pump 18, and a non-return valve 47. This retaining tank 46 temporarily retains the thermal heating medium, and the amount of the thermal heating medium in the first circulation path 13 and the second circulation path 22 is increased by the capacity of this retaining tank. It should be understood that the reference symbol 48 in FIG. 6 denotes a temperature sensor, which is provided to the thermal accumulator 44, while the reference symbol 49 denotes a heat storage material, which is stored in the thermal accumulator 44. Since the other structures are the same as the ones shown in FIG. 1, accordingly, in FIG. 6, the same reference symbols as in FIG. 1 are appended to elements that are the same as those in FIG. 1, and the description thereof is not provided.

In the case of a structure like the one shown in FIG. 6, if there is no request for heating the vehicle passenger compartment, in other words if there is no request for operation of the first circulation path 13, then the three-way valve 45 is changed over to communicate with the second circulation path 22, and moreover the pump 18 is driven. Accordingly, the thermal heating medium extracts heat from the refrigerant in the heat storage type condensation device 2 and condenses the refrigerant, and thereafter passes through the three-way valve 45 and is sent to the retaining tank 46. The thermal heating medium, which is entirely enclosed in the second circulation path 22 including the retaining tank 46, is flowed and circulated in this manner to pass repeatedly through the heat storage type condensation device 2, and, as a result, the thermal heating medium cools the refrigerant, until the temperature of the entire mass of the thermal heating medium is increased to approximately the temperature of the refrigerant. Furthermore, collectively, the heat storage material 3 in the heat storage type condensation device 2 extracts the heat from the refrigerant and thus cools down the refrigerant. Accordingly, since the thermal heating medium fulfils a heat storage function in the same manner as the heat storage material 3, and moreover since, while it is being continuously circulated, its entire mass performs heat storage operation or cooling operation for the refrigerant, thus it is possible to sufficiently supercool the refrigerant. It should be understood that, in the example shown in FIG. 6, the other operations are the same as in the case of a structure such as the one shown in FIG. 1.

Now, an example of another structure in which the refrigerant may be forcibly supercooled will be explained. In the example shown in FIG. 7, the refrigerant may be forcibly supercooled by the flow of the refrigerant into the receiver tank in the refrigeration cycle: a receiver tank 51 is connected by a conduit 52 to the downstream side of a condensation device 50 (a condenser). The condensation device 50 may be built with the same structure as that of the heat storage type condensation device 2. A jacket 53 for a supercooling material is provided around the exteriors of the receiver tank 51 and the conduit 52, and a supercooling material to be flows into both the receiver tank 51 and the conduit 52 to be cooled. Brine having a freezing point of around −10° C. or lower may be employed here as the supercooling material.

A tank 54 is provided for holding the supercooling material, and this tank 54 and the jacket 53 are communicated together by a circulation path 55. And a non-return valve 56 and a pump 57 are interposed in order in the conduit from the jacket 53 to the tank 54. The conduit 52 communicates the condensation device 50 with the receiver tank 51. In addition, a pressure sensor 58 is attached to the conduit 52 to detect the pressure in the interior of the conduit. This pressure sensor 58 is electrically connected to a control device 59, which controls the pump 57, and it is arranged for control of starting and stopping of the pump 57 to be performed based upon the pressure which is thus detected.

Figure 7:
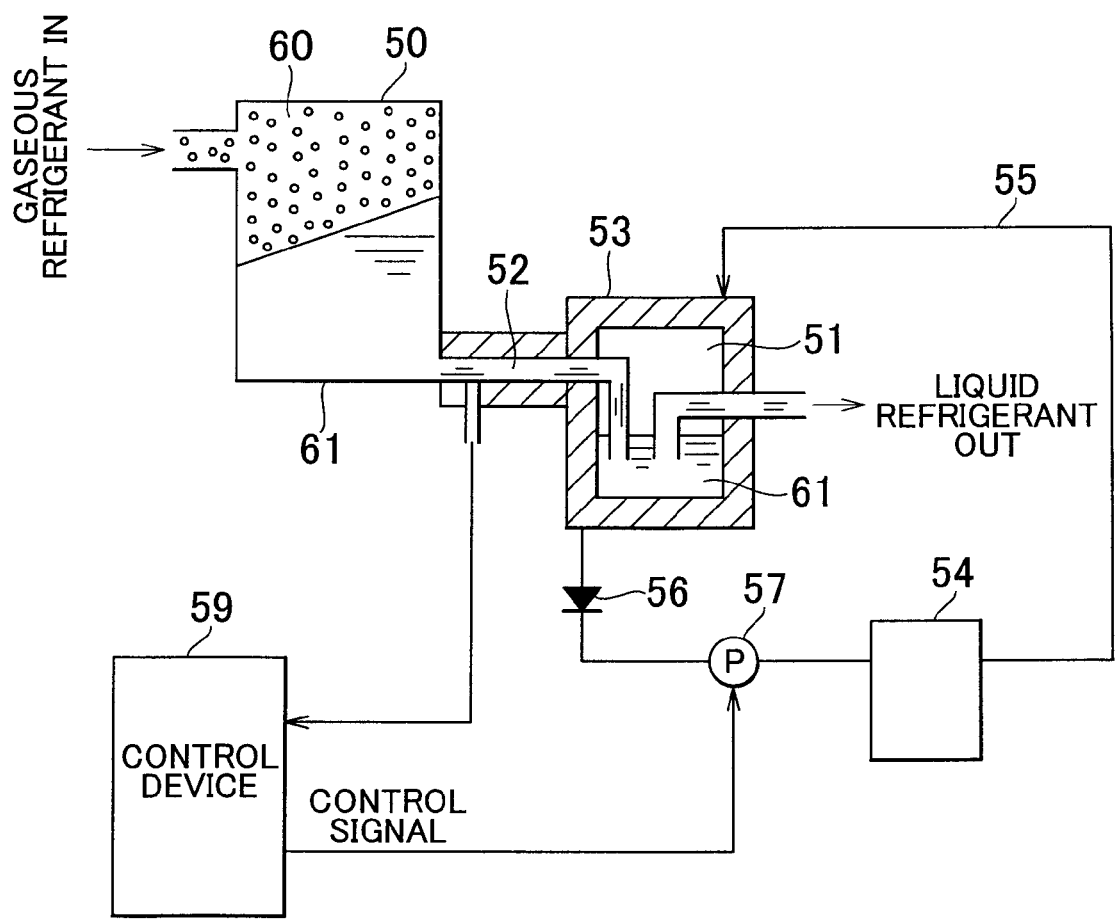
FIG. 7 is a block diagram showing an example, which is made so that forced supercooling is performed in a receiver tank.

In the case of a structure like the one shown in FIG. 7, the gaseous refrigerant 60 having a temperature has been elevated by compression is liquefied by heat dissipation in the condensation device 50. The liquid refrigerant 61 is forwarded to the receiver tank 51 via the conduit 52, and, if the refrigerant is not sufficiently liquefied, in other words, if it is not supercooled, then it is gas-liquid separated in the receiver tank 51. Furthermore, in this case, since the pressure in the conduit 52 is elevated, accordingly the pump 57 is driven according to a control signal from the control device 59 based upon this pressure signal. Since, as a result, the supercooled material is supplied into the jacket 53 and is circulated therethrough, accordingly the refrigerant is forcibly cooled and transits to the supercooled state.

Figure 8:
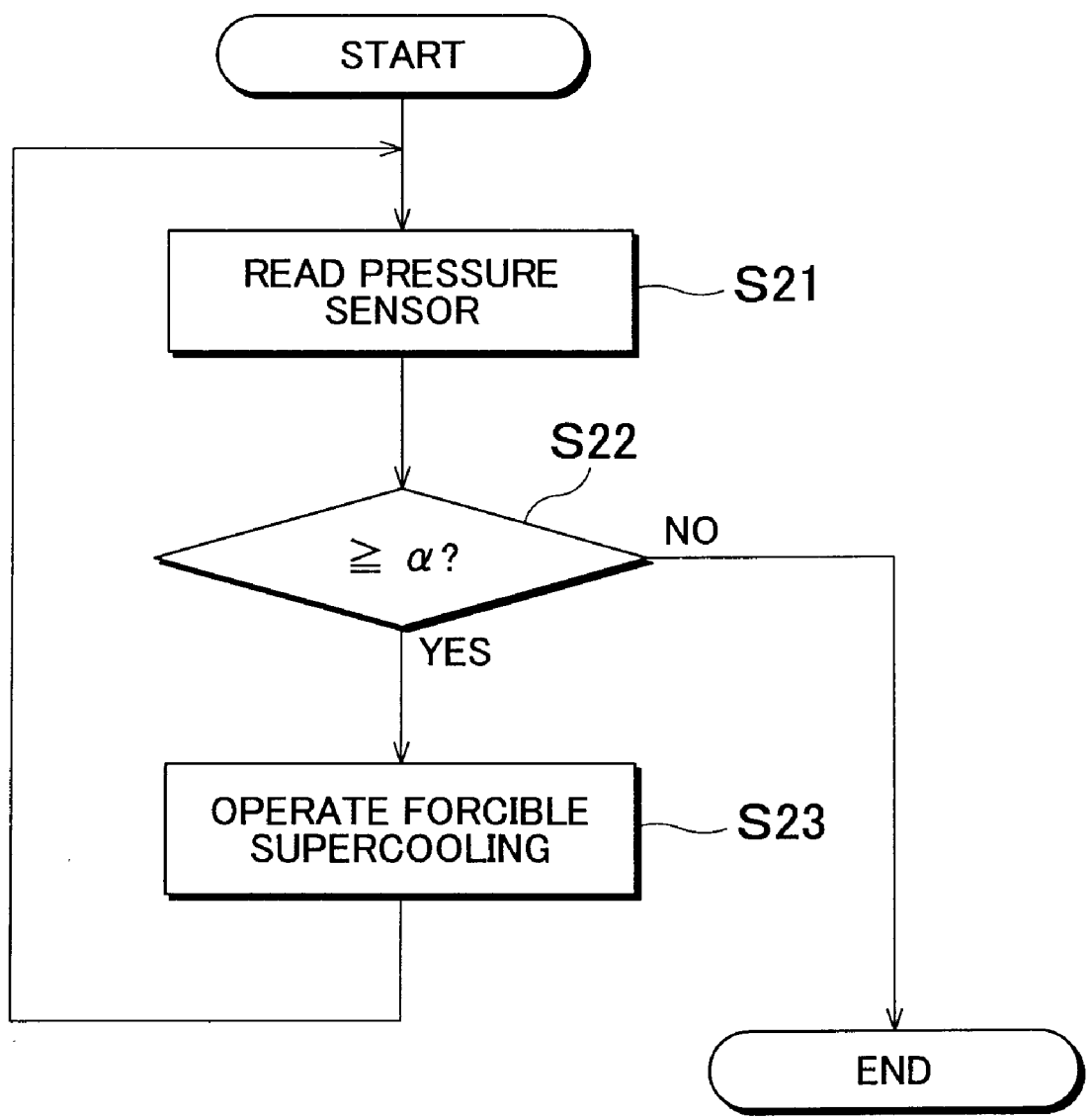
FIG. 8 is a flow chart for explanation of an example of control, which takes as its object the system shown in FIG. 7.

An example of this type of control is shown in the flow chart of FIG. 8. That is to say, first (in a step S21) the value detected by the pressure sensor 58 is read in. Next, it is determined whether the detected value is greater than or equal to a reference value a (in a step S22). If it is determined in the step S22 that the detected value is greater than or equal to the reference value a, then, since it is decided that the refrigerant is not in the supercooled state, accordingly the decision for the forcible supercooling mode holds, and control for this is executed (in a step S23). In other words, the pump 57 is started and the supercooling material is supplied into the jacket 53. On the other hand, if it is determined that the detected value less than the reference value a, then, since it is decided that the refrigerant has become supercooled, no particular control is performed, and the process shown in FIG. 8 ends.

Figure 9:
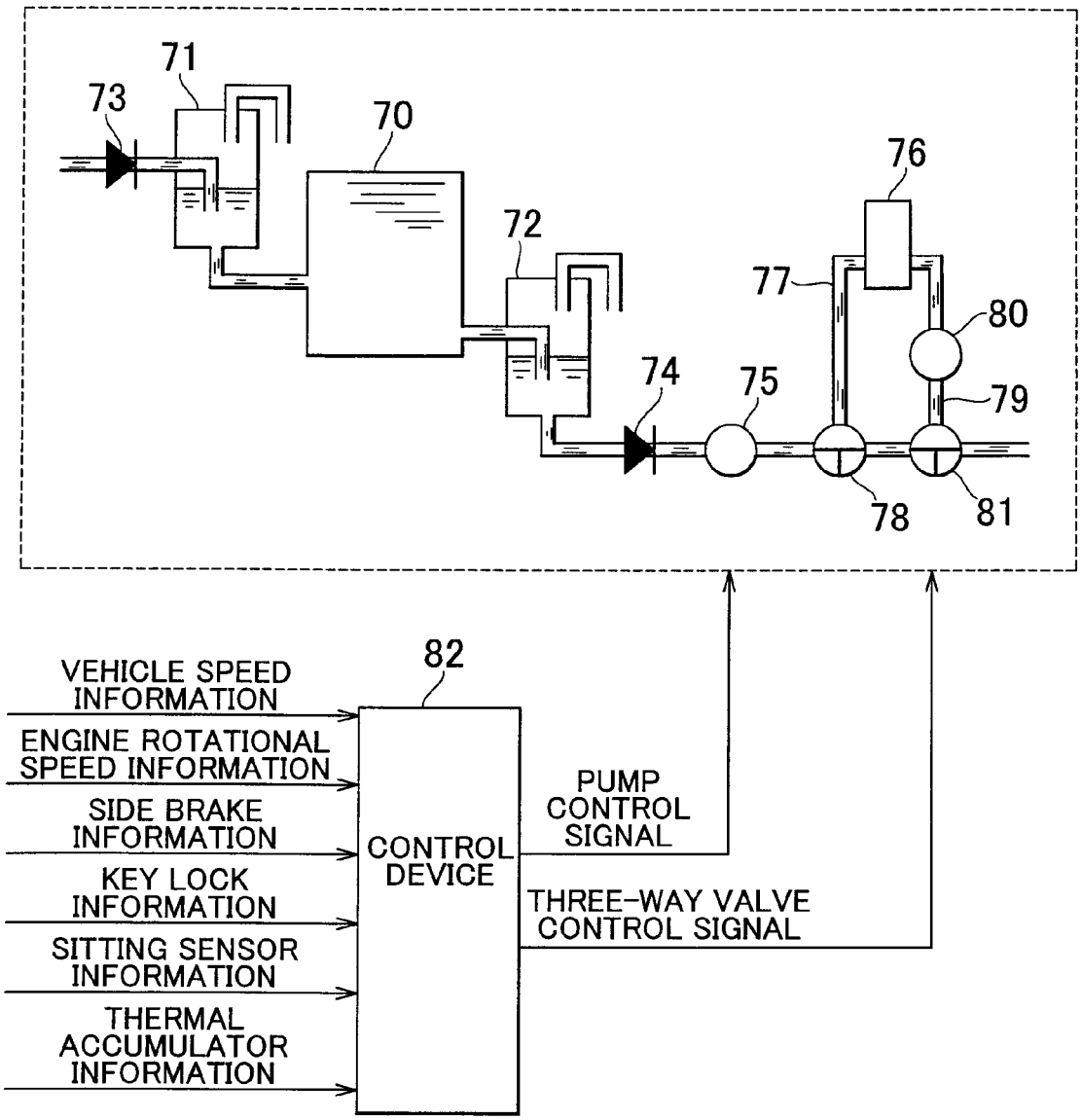
FIG. 9 is a partial block diagram showing an example of a device, which is made so that, when the system is stopped, the thermal medium is extracted from a thermal accumulator.

By the way, since the previously described thermal medium (brine) for heating or for air conditioning the vehicle passenger compartment is endowed with good heat conductivity, accordingly, if the thermal medium is always in contact with the heat storage material 3 or cold energy thermal storage material 9 so that heat transmission between them is possible, then there is a possibility that the heat or cold energy held in this heat storage material 3 or 9 will be lost by emission via the thermal medium. In order to prevent or suppress this state of affairs, a structure like the one below is desirable. In FIG. 9, there is shown an example of a structure in which, in the previously described system shown in FIG. 1 or FIG. 4 that stores heat or cold by circulating a thermal medium via a thermal accumulator 70, which is endowed with a heat storage function or a cold storage function, in its state in which this refrigeration cycle is halted, the thermal medium is extracted from the thermal accumulator 70. In other words, to both sides of the thermal accumulator 70 which can perform heat exchange between the thermal medium and the heat storage material (not shown in the figure), both before and after thereof, there are connected receiver tanks 71 and 72, and non-return valves 73 and 74 are connected at the inflow side of the receiver tank 71 on the upstream side, and on the outflow side of the receiver tank 72 on the downstream side, respectively, The pump 75 is connected downstream of the non-return valve 74, and an accumulator tank 76 is connected in a bypass on the downstream side of this pump 75. The accumulator tank 76 may contain the thermal medium extracted from the thermal accumulator 70, and its intake conduit 77 is connected to the discharge side of the pump 75 via a three-way valve 78. Moreover, a pump 80 is interposed in the discharge conduit 79 of the accumulator tank 76, and the discharge conduit 79 is connected, via another three-way valve 81, to the downstream side of the three-way valve 78.

A control device 82 is provided that outputs control signals to the pumps 75 and 80, and that also outputs control signals for controlling the changeover operation of the three-way valves 78 and 81. The control device 82 principally consists of a microcomputer, and various types of information are inputted thereto as control information. That is, the example shown in FIG. 9 is a system that is mounted in an automobile, and accordingly information such the vehicle speed, engine rotational speed, engagement of the side brake, key lock information, sitting sensor information, thermal accumulator information and the like is input to the control device 82.

Figure 10:
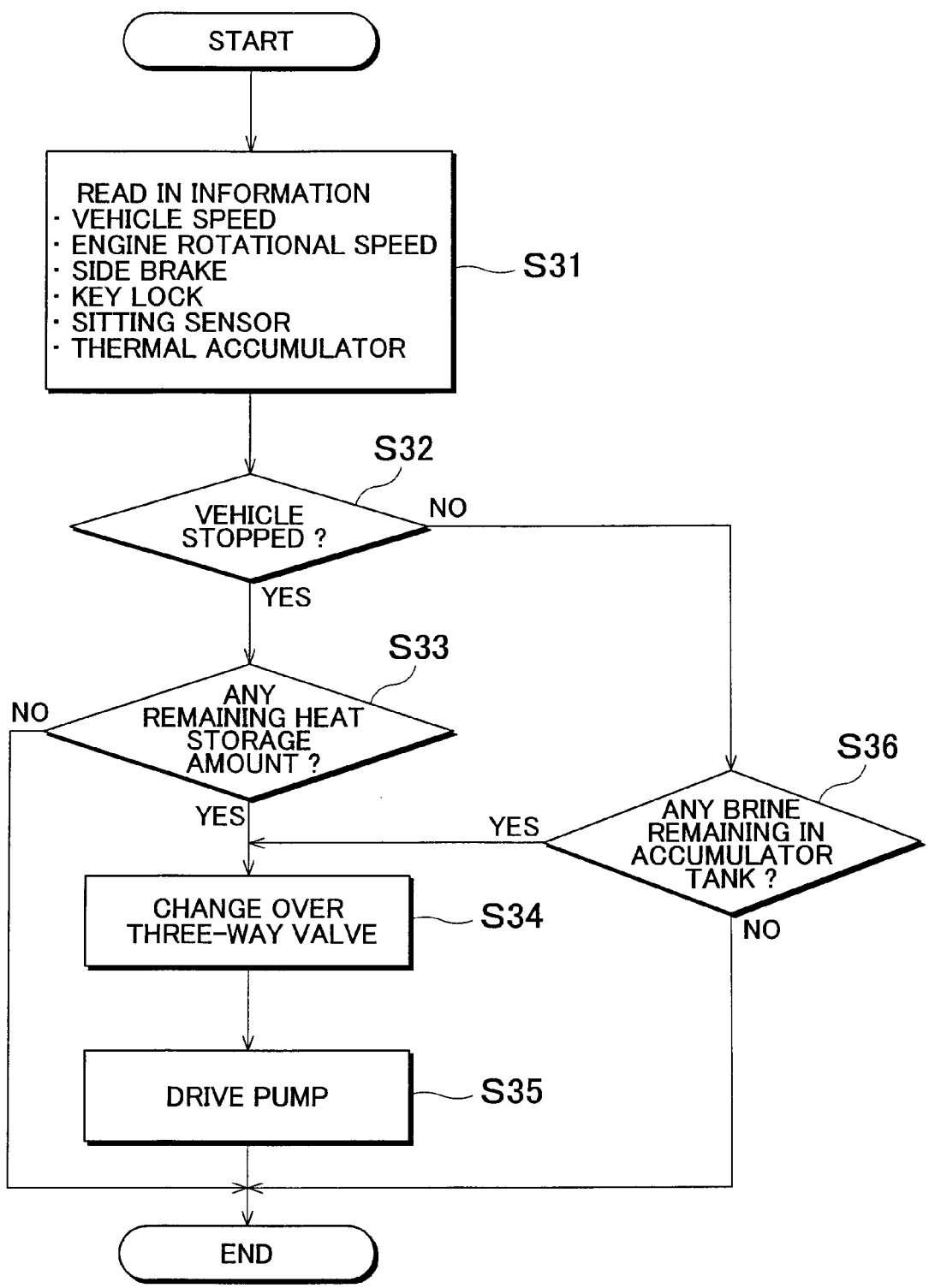
FIG. 10 is a flow chart for explanation of an example of control, which takes as its object the system shown in FIG. 9.

FIG. 10 is a flow chart showing the example of control executed by the system shown in FIG. 9; the control example is an example of a control for preventing heat dissipation or heat absorption via the thermal medium from the heat storage material. First, the various previously described types of information are read in (in a step S31). A decision is made, based upon the information that has been read in, as to whether the vehicle is stopped (in a step S32). In other words, the control device 82 may determine that the vehicle is stopped based upon the vehicle speed being zero, or based upon the brake being applied by the side brake being pulled, or based upon the key lock being on, or the like.

If an affirmative determination has been made in step S32, then then it is determined (in a step S33) whether there is heat remaining in the thermal accumulator 70. In other words, a decision is made as to whether there is an amount of heat in the thermal accumulator 70 that can be dissipated, or as to whether it is cooled down to a degree at which it can absorb heat from the outside and thus contains a certain amount of cold energy. If a negative decision has been made in the step S33, then the routine is temporarily terminated, since transfer of heat between the thermal accumulator 70 and the exterior will not occur. If, conversely, an affirmative decision has been made in the step S33, then, since it is necessary to suppress or to prevent transfer of heat between the thermal accumulator 70 and the exterior, accordingly the control is performed to do so. That is, first, both of the three-way valves 78 and 81 are switched over, so that, along with the intake conduit 77 of the accumulator tank 76 being communicated with the pump 75, its discharge conduit 79 is intercepted into the main flow conduit for the thermal medium. In the state the pump 75 is driven (in a step S35). Since, as a result, the thermal medium is fed into the accumulator tank 76, accordingly the thermal medium is extracted from the thermal accumulator 70. Due to this, although the thermal accumulator still possesses a remaining heat storage amount, since the thermal medium is not in contact with the thermal accumulator 70, accordingly the thermal medium does not mediate heat transfer between the thermal accumulator 70 and the exterior, so that it is possible to prevent or to suppress unnecessary dissipation or absorption of heat from the thermal accumulator 70.

On the other hand, if a negative determination is made in the step S32, because, for example, the vehicle is moving, then a decision is made (in a step S36) as to whether there is any thermal medium remaining in the interior of the accumulator tank 76. If an affirmative decision has been made in the step S36, then the three-way valves 78 and 81 are changed over (in a step S34) so that the thermal medium is extracted from the accumulator tank 76, and moreover the pump 80 is driven (in a step S35). In other words, the three-way valve 78 on the upstream side is operated so as to intercept the intake conduit 77 into the main circulation path for the thermal medium, and moreover the three way valve 81 on the downstream side is operated so as to communicate the accumulator tank 76 with the main circulation path for the thermal medium. It should be understood that, if a negative decision has been made in the step S36, then no particular control is performed, and the routine ends. Accordingly, if the vehicle is in motion, the thermal medium is returned to the circulation path via the thermal accumulator 70.

Figure 11:
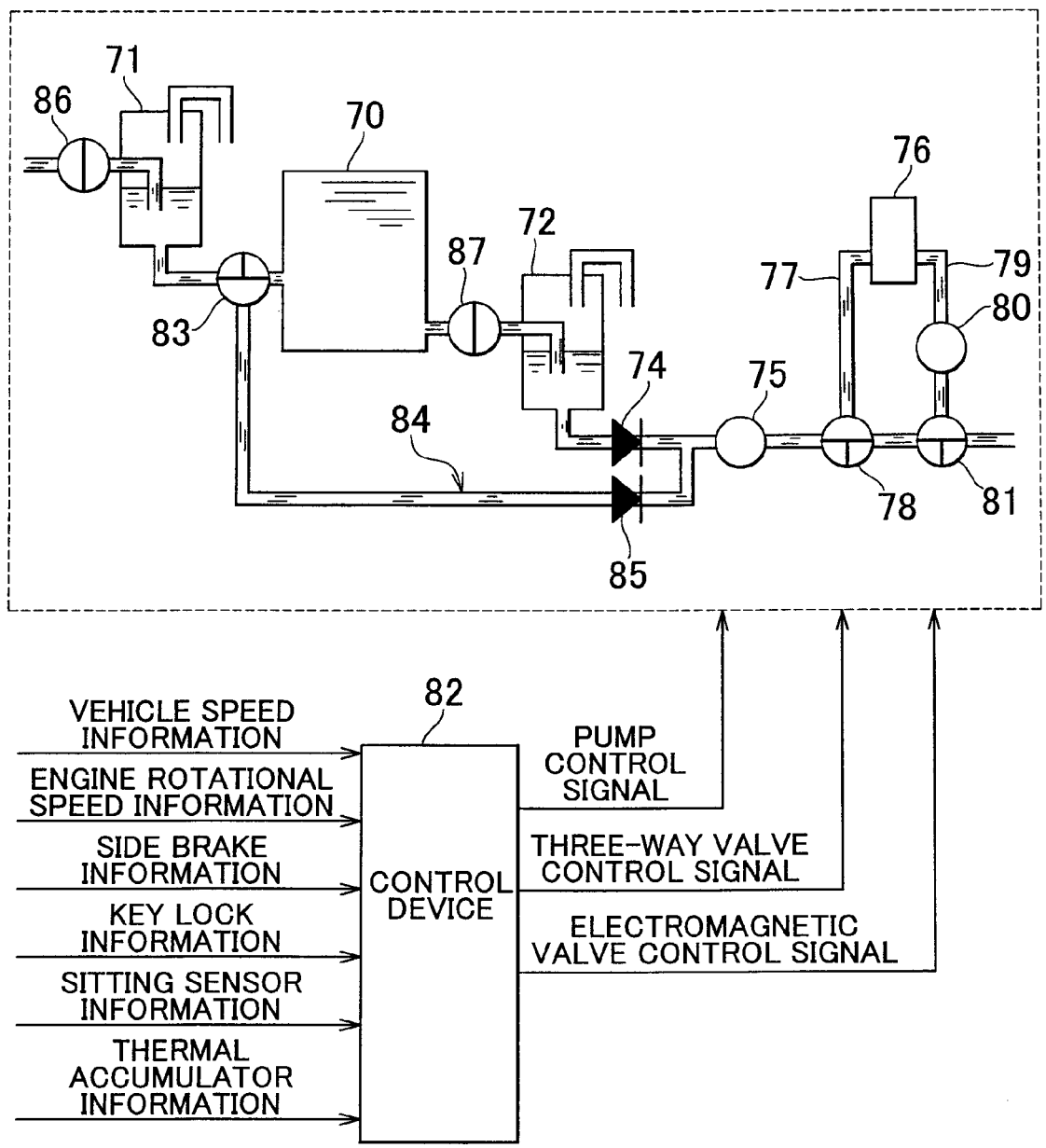
FIG. 11 is a partial block diagram showing an example of a device which is made so that, when the system is stopped, the thermal medium is extracted both from the front side and from the rear side of a thermal accumulator.

In order to suppress dissipation or absorption of heat from the thermal accumulator or the cold storage device when the vehicle is stationary, it would also be acceptable to divert the thermal medium in the neighborhood of the thermal accumulator or the cold storage device instead of extracting the thermal medium. FIG. 11 shows an example made in this manner. A bypass conduit 84 is connected to the inflow side of the thermal accumulator 70 via a three-way valve 83. Along with this, bypass conduit 84 has a non-return valve 85 that is connected between the pump 75 and the non-return valve 74 on the downstream side. In other words, the bypass conduit 84 bypasses the thermal accumulator 70 and the receiver tank 72 on the downstream side of the receiver tank 72.

Furthermore, on the inflow side of the receiver tank 71, an electromagnetic valve 86, which can be opened and closed, may be provided instead of a non-return valve. Moreover, an electromagnetic valve 87, which can also be opened and closed, may be interposed between the thermal accumulator 70 and the receiver tank 72 on its downstream side. Since the other structures are the same as the ones shown in FIG. 9, the same reference symbols as in FIG. 9 are appended in FIG. 11 to elements that are the same as those in FIG. 9, and the description thereof is curtailed.

Figure 12:
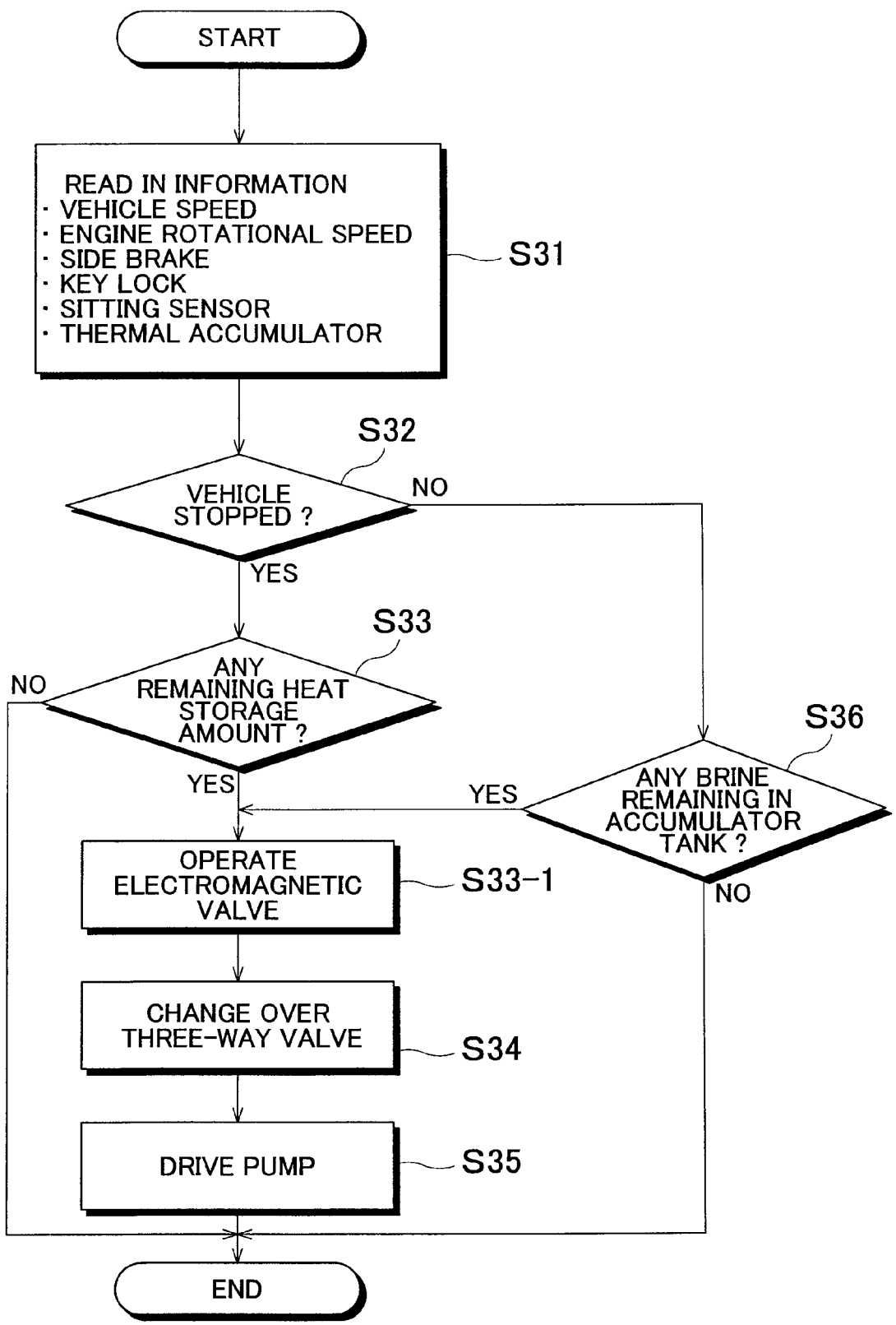
FIG. 12 is a flow chart for explanation of an example of control, which takes as its object the system shown in FIG. 11.

An example of the control process embodied the structure shown in FIG. 11 and described above is illustrated by the flow chart in FIG. 12. The example of the control process shown in FIG. 12 is similar to the control process example shown in FIG. 10, but it differs in that, when the system stops, both of the electromagnetic valves 86 and 87 are closed. In other words, after the various items of information have been read in (in a step S31), it is determined whether the vehicle is stopped (in a step S32), and, if the vehicle is stopped, then it is determined (in a step S33) whether there is any remaining amount of stored heat. If there is no remaining amount of stored heat, then no particular control is performed, and the routine ends. However, if there is some remaining amount of stored heat, then the electromagnetic valves 86 and 87 are closed (in a step S33-1). Thereafter, the three-way valves 83, 78, and 81 changed over (in a step S34). In concrete terms, the upstream side of the receiver tank 71 is communicated with the bypass conduit 84 by the three-way valve 83, the pump 75 is communicated with the intake conduit 77 by the three-way valve 78, and the discharge conduit 79 is diverted by the three-way valve 81.

In this state, the pump 75 is driven (in a step S35). As a result, the thermal medium is extracted from the receiver tanks 71 and 72, which are disposed on both the sides of the thermal accumulator 70, and is transferred to the accumulator tank 76. By doing this, even if some of the thermal medium should remain in the thermal accumulator 70, since a state is established in which the thermal medium is extracted from both the front side and the rear side of the thermal accumulator 70 and is diverted, accordingly the dissipation or or absorption of heat via the thermal medium is prevented or suppressed.

To explain the relationship between the concrete examples described above and the Claims for the present invention in simple terms: the refrigerant described above corresponds to an example of the "heat afferent medium" of the Claims; the three-way valves 23, 39, and 45 shown in FIGS. 1, 4, and 6 correspond to an example of the "changeover means" of the Claims; the heat exchanger shown in FIG. 2 corresponds to an example of the "heat exchange site with the heat afferent medium" of the Claims; and the portion of the second circulation path 22 in FIG. 1 where it pierces through the heat storage material 3 corresponds to an example of the "heat exchange side with the first heat storage material" of the Claims. Furthermore, the heat exchanger 12 within the passenger compartment described above corresponds to an example of the "heat demand unit" of the Claims, and the control device 83 which controls the three-way valve 23 and the pump 18 of FIG. 1 corresponds to an example of the "means for circulating the thermal medium between sites" of the Claims. Moreover, the retaining tank 46 shown in FIG. 6 corresponds to an example of the "tank which retains the thermal medium" of the Claims.

It should be understood that, if a negative determination is reached in the step S32 because the vehicle is moving, the control process is performed in the same manner as described in the control process shown in FIG. 10, based on whether any thermal medium remains in the accumulator tank 76. It should be understood that, in this case, the electromagnetic valves 86 and 87 are kept open.

It should be understood that the present invention is not limited to the examples described above, and is not limited to an air conditioning system for the interior of a passenger compartment; it may also be applied to a system for cooling and/or heating any suitable empty space, such as a room in a residence or a warehouse or the like.

The invention claimed is:

1. A heat storage device of a vehicle heat pump, comprising:
   a first heat storage material which exchanges heat with a heat afferent medium and accumulates heat;
   a second heat storage material which exchanges heat with the heat afferent medium and accumulates heat, whereby the second heat storage material is a thermal medium which circulates between a first site where it exchanges heat with the heat afferent medium, and a second site where it exchanges heat with the first heat storage material, the first site and the second site being located within the first heat storage material;
   a heat demand unit to which the thermal medium is supplied;
   a changeover device which selectively performs or intercepts heat exchange between the heat afferent medium and the thermal medium;
   a first circulation path configured to circulate the thermal medium between the first site, the first heat storage material, and the heat demand unit; and
   a second circulation path including a portion in common with the first circulation path, the second circulation path being configured to circulate the thermal medium so as to repeatedly supply the thermal medium to the first and second sites without passing it through the heat demand unit.

2. A heat storage device as described in claim 1, wherein the changeover device circulates the thermal medium between the first site and the second site, when there is no heat demand by the heat demand unit.

3. A heat storage device as described in claim 1, wherein the second heat storage material includes the thermal medium which performs heat exchange between the heat afferent medium and the first heat storage material; and wherein the heat storage device further comprises
   a tank which is interposed in the portion common to the first and second circulation paths, and which retains the thermal medium.

4. A heat storage device as described in claim 1, wherein a heat exchanger is further provided in the interior of the first heat storage material, where the heat afferent medium and the first heat storage material and the second heat storage material perform heat exchange via a division wall, the division wall being located between the heat afferent medium and the second heat storage material.

5. A heat storage device as described in claim 1, wherein the heat afferent medium includes a refrigerant having a refrigeration cycle in which, along with its internal energy being decreased by heat dissipation after it has been pressurized, its internal energy is increased by absorption of heat after it has expanded adiabatically.

6. A heat storage device as described in claim 5, wherein the first heat storage material includes at least one of a heat storage material which receives and thermally stores heat from the refrigerant, and a cold energy storage material which supplies heat to the refrigerant and accumulates cold energy.

* * * * *